INVENTORS
JOHAN A. RIETDIJK
HERMAN H.M. VAN DER AA
HENRICUS C.J. VAN BEUKERING
ROELF J. MEIJER
BY
AGENT

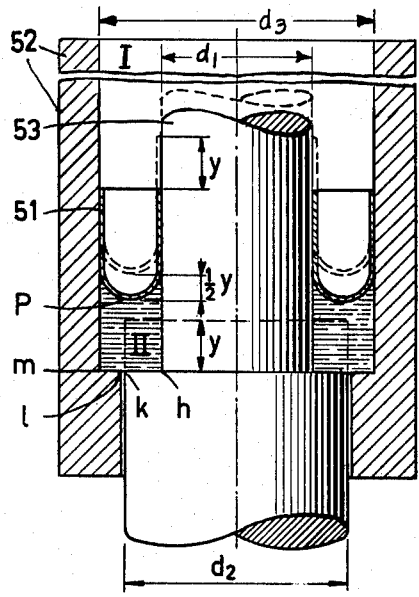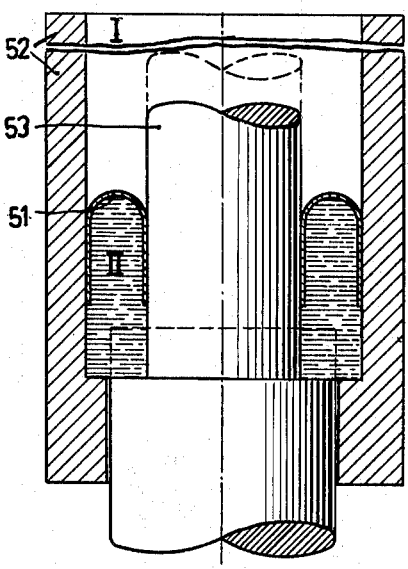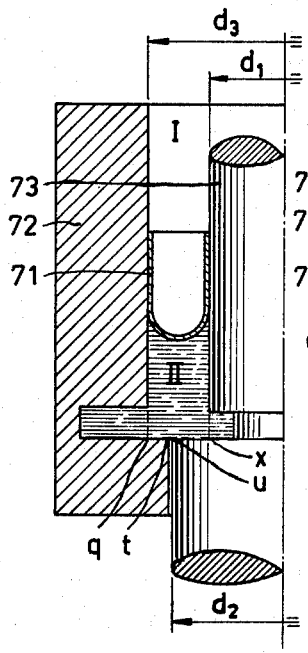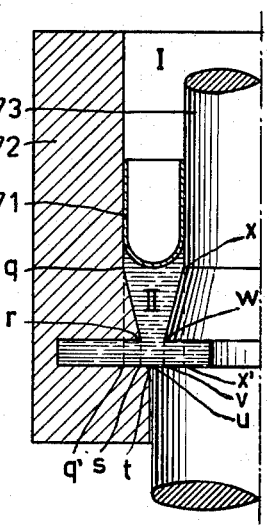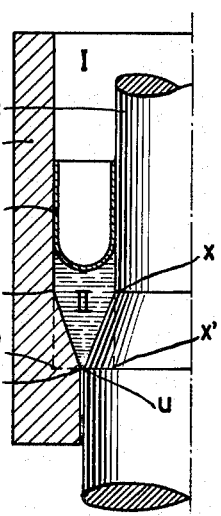

INVENTORS
JOHAN A RIETDIJK
HERMAN H.M. VAN DER AA
HENRICUS C.J. VAN BEUKERING
ROELF J. MEIJER
BY
AGENT

United States Patent Office 3,241,379
Patented Mar. 22, 1966

3,241,379
DEVICE OF THE KIND COMPRISING ROLLING DIAPHRAGM SEALS BETWEEN TWO RELATIVELY RECIPROCATING COAXIAL ELEMENTS
Johan Adriaan Rietdijk, Herman Henricus Maria van der Aa, Henricus Cornelis Johannes van Beukering, and Roelf Jan Meijer, Eindhoven, Netherlands, assignors to North American Philips Company, Inc., New York, N.Y., a corporation of Delaware
Filed June 12, 1962, Ser. No. 201,962
Claims priority, application Netherlands, June 16, 1961, 266,067
8 Claims. (Cl. 74—18.2)

The invention relates to a device comprising a rolling diaphragm seal between two relatively reciprocating, coaxial elements. This seal separates two spaces, one of which contains a medium, whereas the other is filled completely with an at least substantially incompressible medium. Such a seal may be used for sealing rods or pistons.

With a known seal of the kind set forth the space containing the incompressible medium is bounded by two rolling diaphragms extending in opposite directions. One rolling diaphragm separates this space from a space containing a medium subjected to pressure, whereas the other rolling diaphragm closes this space from the atmosphere. The incompressible medium is, in this case, always subjected to a higher pressure than the pressure prevailing in the space containing the compressed medium. It is obvious that the maximum permissible pressure difference at this seal is restricted by the maximum permissible stress of the diaphragm separating the space of the incompressible medium from the atmosphere.

An advantageous embodiment of the device according to the invention is characterized in that the rigid wall portions of the relatively movable elements, forming part of the boundaries of the space containing the incompressible medium, have a shape such that with the relative movement of the elements the volume of the said space remains constant solely due to this shape. This embodiment has the advantage that in the operation of the device the diaphragm is not subjected to variations in length. Due to the pressure of the medium in the space on the other side of the diaphragm the diaphragm is urged against the incompressible medium, which thus serves as a support, so that the tension occurring in the diaphragm is restricted. The convex side of the diaphragm may be orientated towards the space containing the incompressible medium or away therefrom.

A further advantageous embodiment of the device according to the invention has the feature that the rigid wall portions of the relatively movable elements, forming part of the boundaries of the space containing the incompressible medium have equal surfaces, projected in a plane at right angles to the axis of the device. This structure of the movable elements provides an extremely simple construction, in which the volume of the space containing the incompressible medium remains constant.

Various substances may be used for the incompressible medium. These substances have to fulfil the requirement that they should be capable of matching the variations in shape of the space in which they are contained. A suitable substance for this medium is a mass formed by a granular, solid substance. It is advantageous, however, to use a liquid as a medium.

An advantageous embodiment of the device according to the invention has the feature that the incompressible medium is formed by a fluid and that the device comprises means for compensating leakage of medium.

A further embodiment of the device according to the invention is characterized in that the compensating means for the fluid are formed by a fluid pump.

Since usually lubricating oil will be available in the device, an advantageous embodiment of the device according to the invention is characterized in that the incompressible medium is formed by the lubricating oil of the device and in that the supply means for this lubricating oil are formed by an oil control-ring operating as a fluid pump.

An advantageous embodiment of the device according to the invention has the feature that provision is made of means for the supply of medium and of a control-mechanism responding to the pressure difference prevailing on the diaphragm and capable of conducting away an excess quantity of medium. Since in most cases the quantity of leakage of medium can be determined only with difficulty, the supply of the correct quantity of medium is usually not feasible. In order to overcome this difficulty, an excess quantity of medium is supplied, while the excess supply is conducted away through a control-valve. This control-valve is adjusted so that a constant pressure difference is maintained on the diaphragm.

In a further advantageous embodiment the device according to the invention is characterized in that the diaphragm is made of an elastomer and the convex side of the diaphragm is orientated towards the space containing the fluid and in that the diaphragm is at least partly in contact with the walls of the relatively movable elements, so that it closes a medium outlet provided in at least one of the elements while, if the pressure difference on the diaphragm drops below a given value, the diaphragm releases this outlet at least for part of the stroke. An elastomer is to be understood herein to mean a substance having rubber properties, for example rubber or "vulkollan." In this embodiment use is made of the elasticity of the diaphragm, so that, when the pressure difference on the diaphragm decreases, the length of the diaphragm, measured transversely to its circumferential direction, decreases. Thus the diaphragm will be in contact with the walls of the elements over a smaller distance, so that the outlet opening is released at least partly and medium can flow away.

An advantageous embodiment of the device according to the invention has the feature that the outlet is formed by a porous wall portion allowing medium to pass.

A further advantageous embodiment of the device according to the invention is characterized in that the diaphragm is covered with a comparatively thin layer of diffusion-resistant material. Thus diffusion through the diaphragm is minimized.

The invention will be described more fully with reference to the drawing, which shows a few embodiments of the device according to the invention in diagrammatic representation not corresponding to the real dimensions.

FIGS. 1, 2, 3, 4 and 5 show a few embodiments of the device according to the invention, in which the volume of the space containing the incompressible medium is kept constant solely by the shape of the rigid wall portions forming the boundaries of the said space.

Figure 1:
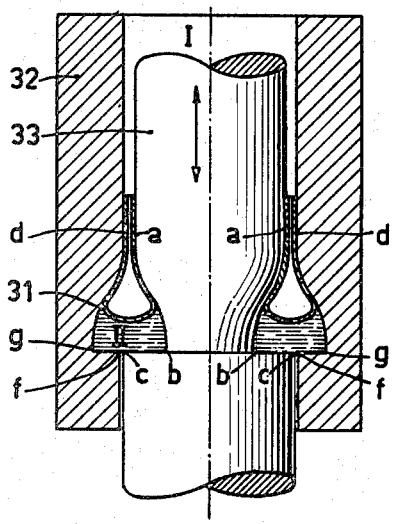

FIG. 1 shows a rolling diaphragm arranged between the relatively movable parts 32 and 33, which diaphragm separates the spaces I and II. The space I contains a liquid or gaseous medium and the space II is filled with an incompressible medium. The wall portions $a$, $b$, $c$ of the part 33 and $d$, $g$, $f$ of the part 32, which portions form part of the boundaries of the space II, are constructed so that during the relative movement of the parts 32 and 33 the volume of the space II remains constant without involving a variation in length of the rolling diaphragm 31, viewed in a cross section. The space II contains only such a quantity of incompressible medium that owing to the pressure prevailing in the space I the diaphragm has a comparatively small tension. Apart from the aging phenomena of the diaphragm the said tension is constant during the operation of the device. This arrangement and supporting of the diaphragm has the advantage that this seal may be employed for very high pressures and great pressure fluctuations in the space I (which pressures are transferred via the folling diaphragm to the incompressible medium in the space II). While a long lifetime of the rolling diaphragm may yet be ensured.

Figure 2:
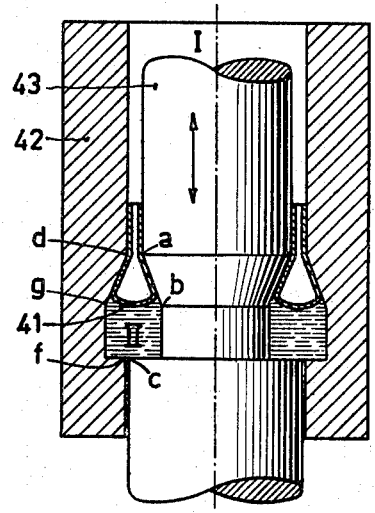

FIG. 2 shows a rolling diaphragm 41, arranged between the structural parts 42 and 43. This embodiment is, in principle, identical to the embodiment shown in FIG. 1, only the wall portions $a$, $b$, $c$, of the part 43 and $d$, $f$, $g$ of the part 42 are shaped in a slightly different form. Also here the requirement is to be fulfilled that during the relative movement of the parts 42 and 43 the volume of the space II should remain constant with a constant length of the cross section of the rolling diaphragm 41.

FIGS. 3 and 4 show a rolling diaphragm 51, arranged between the relatively movable structural parts 52 and 53. The rolling diaphragm separates the spaces I and II, of which the space I again contains a liquid or gaseous medium, subjected to pressure and the space II contains an incompressible medium. In this embodiment the part 53 is built up from two cylindrical portions having constant, relatively different diameters $d_1$ and $d_2$. The part 52 is provided on its inner periphery with two cylindrical wall portions, having diameters $d_3$ and $d_2$. To these diameters applies the relation:

$$d_2^2 = \tfrac{1}{2}(d_1^2 + d_3^2)$$

It is thus ensured that the surfaces of the wall portions $h$–$k$ and $l$–$m$ of the space II are equal to each other, since if the part 53 moves over a distance $y$ upwards, the rolling diaphragm 51 will occupy the position indicated by broken lines in FIG. 3. It is evident that the point P of this diaphragm has moved upwards only over a distance $\tfrac{1}{2}y$. Thus an increase in volume of the space II is produced, which is equal to $\tfrac{1}{2}y(d_3^2-d_1^2)\cdot\tfrac{1}{4}\pi$. Due to the upward movement of the part 53, also the cylindrical portion having the diameter $d_2$ has moved upwards, so that a decrease in volume of the space II is produced. This decrease in volume corresponds to $$y(d_2^2-d_1^2)\cdot\tfrac{1}{4}\pi = y(\tfrac{1}{2}d_1^2+\tfrac{1}{2}d_3^2 - d_1^2)\cdot\tfrac{1}{4}\pi = \tfrac{1}{2}y(d_3^2-d_1^2)\tfrac{1}{4}\pi$$

It appears therefrom that the increase in volume by the displacement of the diaphragm is just compensated by the decrease in volume produced by the displacement of the structural part 53. Thus by an extremely simple shape of the parts 52 and 53 it is achieved that the volume of the space II remains constant, when the length of the cross section shown of the rolling diaphragm remains the same.

The foregoing applies not only to the embodiment shown in FIG. 3 but also to that shown in FIG. 4. The sole difference in the two embodiments consists in that the diaphragm of FIG. 3 has its convex side orientated towards the space II, whereas in the embodiment shown in FIG. 4 this diaphragm has its convex side orientated away from this space. This implies that in the device shown in FIG. 3 the diaphragm has a slight tension by a slightly smaller quantity in the space II than the quantity corresponding to the length of the diaphragm in the unstressed state, whereas in the embodiment shown in FIG. 4 the diaphragm is stretched by a slightly larger quantity of medium in the space II than the quantity corresponding to the length of the diaphragm in the unstressed state, so that the diaphragm is stretched by the incompressible medium.

FIG. 5 shows a few further possible embodiments. The rolling diaphragm 71 is arranged between the relatively movable structural parts 72 and 73 and separates the spaces I and II. These embodiments are all based on the same principle as the seal shown in FIGS. 3 and 4. The rigid portions of the walls of the structural parts 72 and 73 located below the diaphragm 71, which portions form part of the boundary of the space II and which portions face the diaphragm, have equal surfaces in a projection at right angles to the axis of the device. In FIG. 5a these are the wall portions $qt$ and $ux$, which correspond to their projections on a plane at right angles to the axis of the device.

In FIG. 5b these are the wall portions $qrst$ and $uvwx$, which have, in a projection, the equal surfaces $q'st$ and $uvx'$, whereas in FIG. 5c these are the wall portions $qt$ and $ux$, which, in a projection, have the equal surfaces $q't$ and $ux'$.

In order to ensure that the projection of the said wall portions in each embodiment are identical, the same relation must apply to the diameters $d_1$, $d_2$ and $d_3$ of the cylindrical portions of the structural parts 72 and 73 as with the embodiment shown in FIG. 3.

Figure 6:
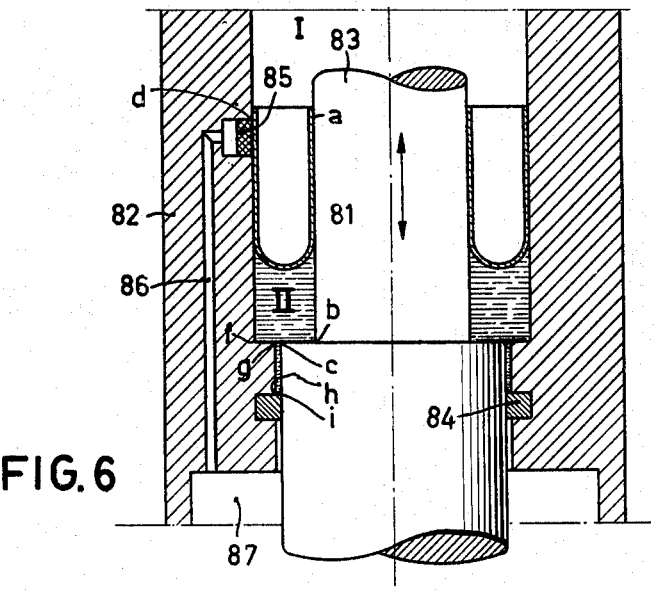
FIG. 6 shows one embodiment of the device according to the invention, in which an excess quantity of medium is fed to the space containing the incompressible medium by means of an oil control-ring, while medium is conducted away through a porous wall portion.

FIG. 6 shows a rolling diaphragm 81 arranged between the relatively reciprocal elements 82 and 83. Also in this case the rolling diaphragm separates two spaces I and II, of which the space I contains the compressed medium and the space II an incompressible medium. Also in this device the rigid wall portions $a$, $b$, $c$ and $d$, $f$, $g$, $h$, $i$, which form part of the boundaries of the space II, are shaped again in the form such that the volume of the space II remains constant during the relative movement of the parts 82 and 83, the length of the diaphragm 81 remaining the same. The embodiment comprises furthermore an oil control-ring 84, which supplies oil to the space II, when the part 83 moves upwards. A part 85 of the wall $df$ of the space II is porous. With this porous wall portion 85 is an oil outlet 86 in communication, this outlet duct opening out in an oil container 87, from which the oil control-ring 84 draws the oil.

The device operates as follows. The oil control-ring 84 feeds oil to the space II. When the pumped-in quantity just corresponds with the quantity disappearing from the space II by leakage, nothing is varied, since the volume of the oil in the space II remains just constant. However, if an excess quantity of medium is fed to the space II, the volume of the oil in space II will increase, so that the diaphragm will be in contact with the walls over a smaller distance. Consequently part of the porous wall portion will be exposed and uncovered from said diaphragm, so that the oil will flow back through the porous wall portion 85 and thence through the duct 86 to the container 87. The diaphragm 81 uncovers the porous wall portion only during part of the stroke. It will be obvious that in this manner a control is obtained, in which the length of the diaphragm remains substantially constant.

Instead of using an oil control-ring, use may be made of a conventional fluid pump for supplying the oil.

The porous wall portion may be formed from any material. It is advantageous to use a porous sintered material. If desired, the porous material may be dispensed with, so that a normal outlet port is formed.

FIG. 6 illustrates the case in which the oil control-ring is arranged in the structural part 82. It will be obvious that the oil control-ring may as well be arranged in the structural part 83.

Figure 7:
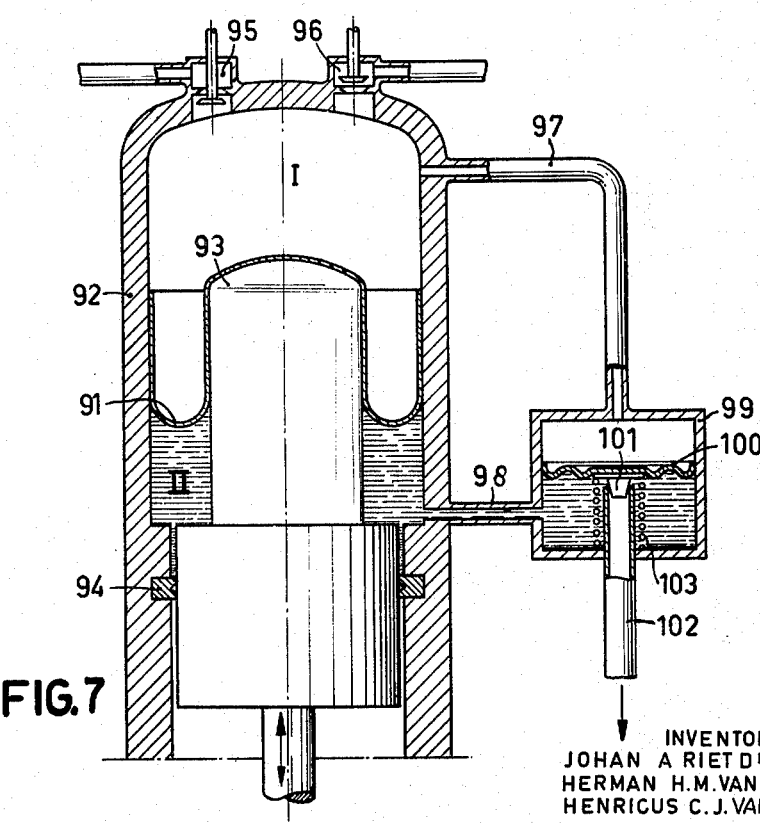
FIG. 7 shows one embodiment of the device according to the invention in which an excess quantity of medium is supplied to the space of the incompressible medium and the medium is conducted away through control-mechanism responding to the pressure difference on the diaphragm.

FIG. 7 shows a rolling diaphragm 91, arranged between a cylinder 92 and a piston 93, adapted to reciprocate herein. Also in this case the diaphragm separates a space I above the piston from a space II below the diaphragm, which space again has a constant volume and is filled with an incompressible medium, in this case for example lubricating oil. In the space I provision is made of a medium, which is subjected, in this case, to pressure fluctuations. The cylinder 92 is furthermore provided with an inlet and an outlet valve housing 95 and 96 respectively. The device comprises furthermore an oil control-ring 94, which supplies oil to the space II, while furthermore two ducts 97 and 98 are provided, which open out at one end in the spaces I and II respectively and at the other end on each side of a diaphragm 100, which is arranged in a housing 99. To the diaphragm 100 is fastened a valve 101, which can close the opening of an oil outlet duct 102. The diaphragm 100 is furthermore subjected to the pressure of a pressure spring 103.

In this embodiment the oil- control-ring 94 supplies oil to the space II. The supplied quantity is at least equal to the quantity of oil flowing out of the space II due to leakage. Thus the volume of the oil in the space II may increase, so that the pressure difference on the rolling diaphragm 91 is reduced. The pressure difference on the rolling diaphragm 91 also prevails on the diaphragm 100. When the pressure difference on this diaphragm drops below a given value, the valve 101 is lifted under the action of the pressure spring 103. Such a quantity of oil can then flow away through the outlet duct 102 that the pressure difference between the values prevailing in the spaces I and II regains the desired value.

Although usually the rolling diaphragm is made from an elastic substance, a rolling diaphragm may, in this device, suffice which is only elastic in the circumferential direction, since in this case, the elasticity does not play a part in keeping the volume of the space II constant, nor in keeping the pressure difference on the rolling diaphragm constant.

What is claimed is:

1. A device comprising two relatively reciprocating coaxial elements, a movable diaphragm seal having the ends thereof secured to said elements and forming a separated upper and lower space, one of said spaces being filled with a substantially incompressible medium and the other of said spaces having a gaseous medium, and the boundaries of said one space having said substantially incompressible medium being formed on one side by said movable diaphragm seal and on the other side by the rigid wall portions of at least one of said relatively reciprocating elements, said rigid wall portions being shaped and dimensioned in such a form that the volume of said one space remains constant during the movement of said relatively reciprocating elements due solely to said shape and dimensions, and the length of said diaphragm seal remains constant.

2. A device as claimed in claim 1 wherein said rigid wall portions projected in a movable plane at right angles to the longitudinal axis of said device have equal surface areas.

3. A device as claimed in claim 1 wherein said substantially incompressible medium is a liquid and further comprising means for compensating for medium leakage in said device.

4. A device as claimed in claim 3 wherein said means is a fluid pump.

5. A device as claimed in claim 3 wherein said medium is lubricating oil and further comprising a means for supplying said oil to said device being an oil control ring.

6. A device comprising two relatively reciprocating coaxial elements, a movable diaphragm seal having the ends thereof secured to said elements and forming a separated upper and lower space, one of said spaces being filled with a substantially incompressible medium and the other of said spaces having a gaseous medium, and the boundaries of said one space having said substantially incompressible medium being formed on one side by said movable diaphragm seal and on the other sides by the rigid wall portions of at least one of said relatively reciprocating elements, said rigid wall portions being shaped and dimensioned in such a form that the volume of said one space remains constant during the movement of said relatively reciprocating elements due solely to said shape and dimensions and the length of said diaphragm seal remains constant, means for supplying an excess quantity of medium to the one of said spaces, and a control mechanism responding to the pressure difference prevailing on said diaphragm seal for conducting predetermined amounts of medium away from said device.

7. A device comprising two relatively reciprocating coaxial elements, a movable diaphragm seal provided with a convex side and a concave side and having the ends thereof secured to said elements and forming a separated upper and lower space, one of said spaces being filled with a substantially incompressible medium and the other of said spaces having a gaseous medium, and the boundaries of said one space having said substantially incompressible medium being formed on one side by said movable diaphragm seal and on the other sides by the rigid wall portions of at least one of said relatively reciprocating elements, said rigid wall portions being shaped and dimensioned in such a form that the volume of said one space remains constant during the movement of said relatively reciprocating elements due solely to said shape and dimensions, said diaphragm seal being constituted of an elastomer and the convex side of said diaphragm seal being oriented toward the space containing said incompressible medium, said diaphragm seal being at least partly in contact with said two relatively reciprocating elements, and a medium outlet in at least one of said elements being closed by said diaphragm seal at a predetermined position thereof, and when the pressure difference in the device drops below a given value, the diaphragm seal is released from said outlet at least during part of the relative movement of said elements.

8. A device as claimed in claim 7 wherein said outlet is a porous wall section permitting medium to pass therethrough.

References Cited by the Examiner

UNITED STATES PATENTS 2,178,953 11/1939 Chilton _____ 74—18.2
2,864,258 12/1958 Klingler _____ 74—18.2

BROUGHTON G. DURHAM, *Primary Examiner.*

MILTON KAUFMAN, *Examiner.*